United States Patent [19]
Bickham

[11] 3,807,588
[45] Apr. 30, 1974

[54] APPARATUS FOR HANDLING PIPE JOINTS COATED WITH MASTIC MATERIAL

[75] Inventor: Francis L. Bickham, Dickinson, Tex.

[73] Assignee: H. C. Price Company, Bartlesville, Okla.

[22] Filed: Nov. 15, 1972

[21] Appl. No.: 306,887

Related U.S. Application Data

[63] Continuation-in-part of Ser. No. 138,078, April 28, 1971.

[52] U.S. Cl. .......... 214/146.5, 214/1 P, 214/130 R, 264/39
[51] Int. Cl. ............................................. B66c 23/00
[58] Field of Search ............ 214/1 P, 130 R, 130 A, 214/130 C, DIG. 3, DIG. 4, 146.5, 149, 1 BD, 1 BV, 3; 264/39

[56] References Cited
UNITED STATES PATENTS
3,318,465  5/1967  Fisher .......................... 214/146.5 X
3,337,071  8/1967  Clark ............................... 214/146.5

*Primary Examiner*—Frank E. Werner
*Attorney, Agent, or Firm*—Lowe, Kokjer, Kircher, Wharton & Bowman

[57] ABSTRACT

A method and apparatus for handling joints of pipe to move the joints to and from a coating line where a mastic type coating is applied. The pipe is automatically moved onto the line by a pair of kickers which assure that the pipe will be rolled rather than slid toward the coating line and also assure that the pipe will be properly aligned when it reaches the coating line. A pair of telescoping arms having pipe-embracing saddles disposed at their outermost ends lift the pipe from the coating line. Each saddle is constructed to apply a lifting force to a joint of pipe to avoid damage to the semi-molten mastic coating. A movable carrier adapted to handle two coated joints of pipe simultaneously receives a joint from the arms and moves it into position where a coupler, which is disposed at the end of the joint during the coating operation, is pulled from the joint. The removed coupler is swung through an arc of 180° to a return line for transfer to a clean-up station. By handling two joints simultaneously the carrier can move one joint into position for finishing of the coated ends while moving a second joint onto holding racks.

6 Claims, 10 Drawing Figures

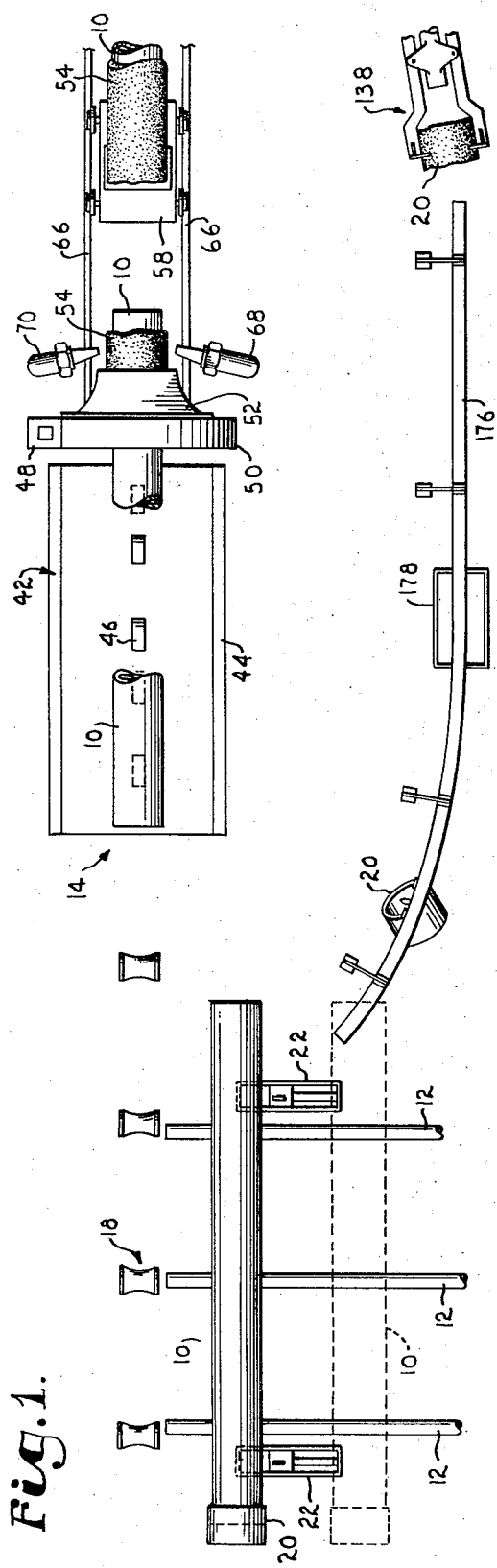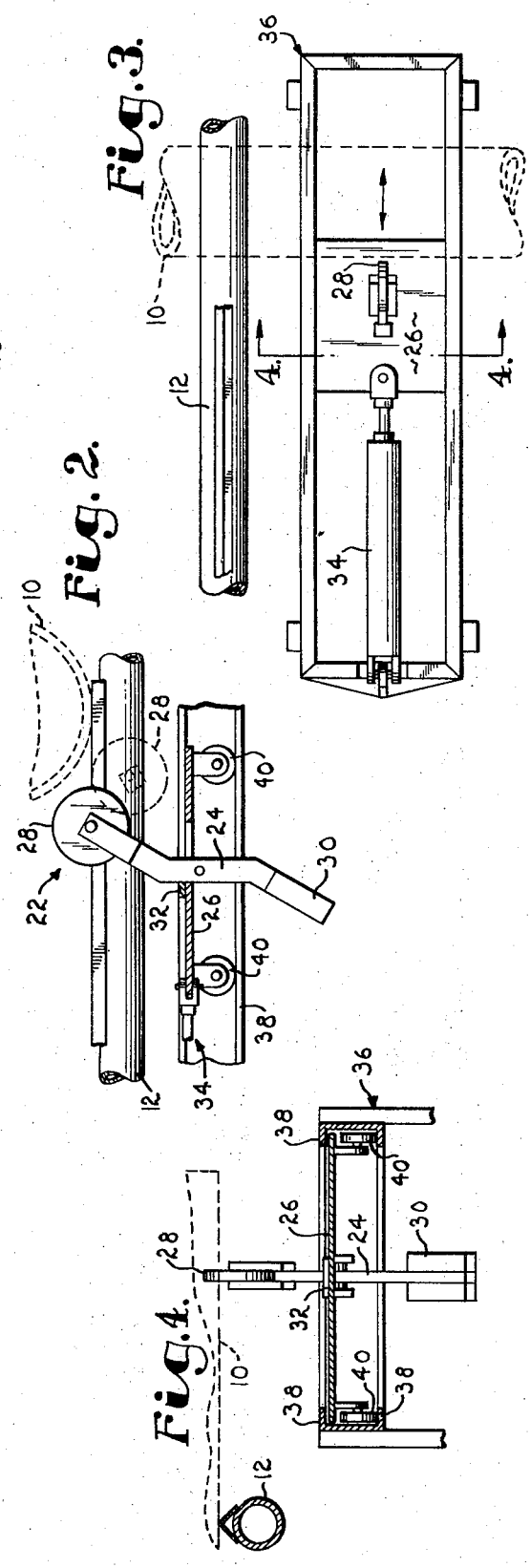

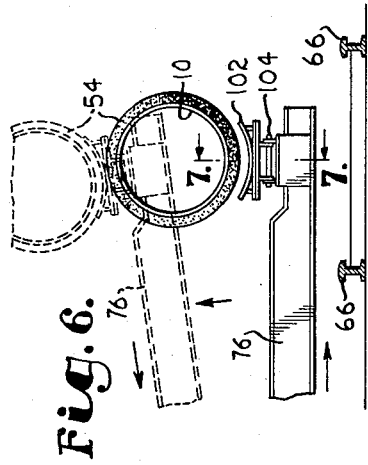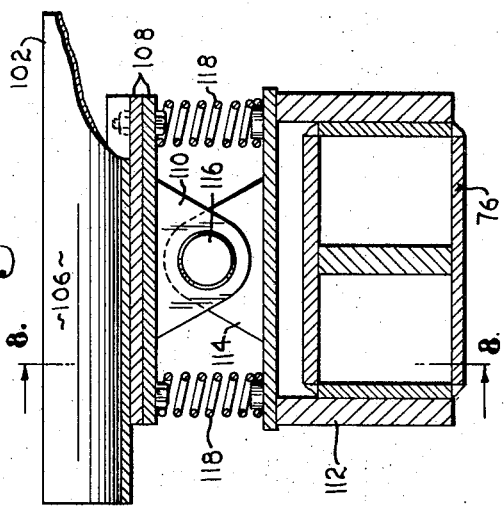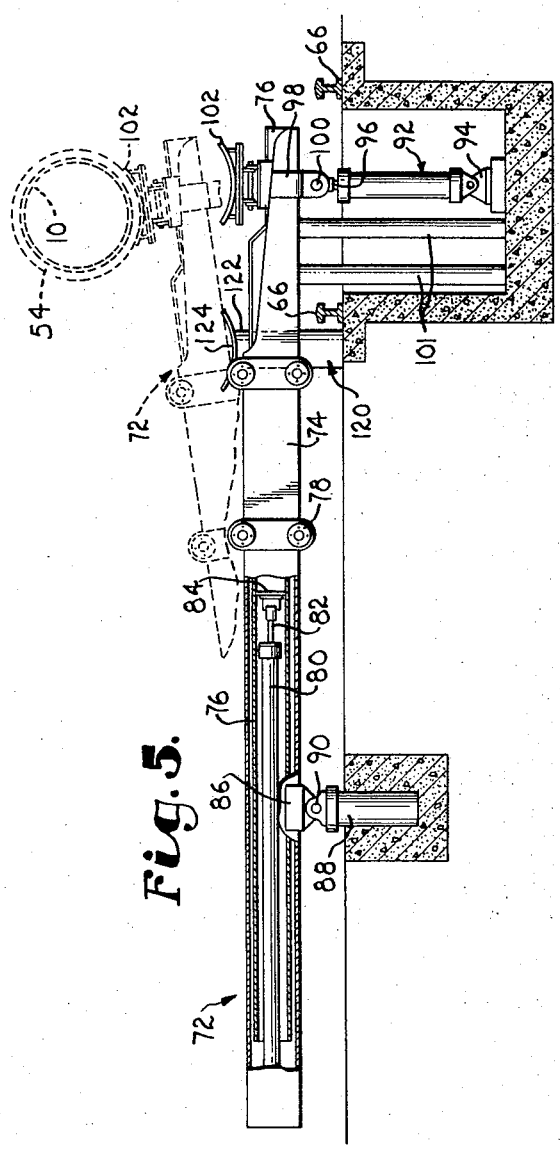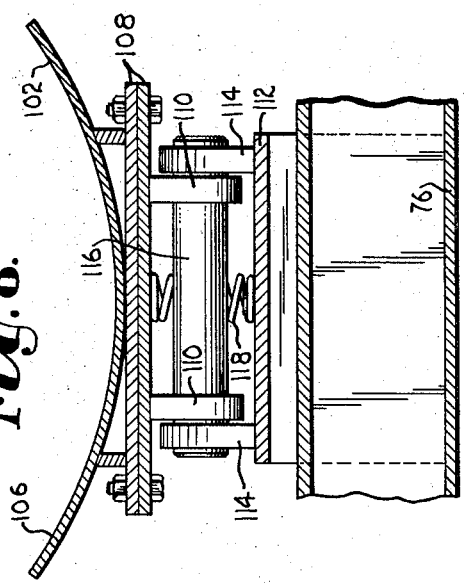

APPARATUS FOR HANDLING PIPE JOINTS COATED WITH MASTIC MATERIAL

This application is a continuation-in-part of pending application Ser. No. 138,078, filed Apr. 28, 1971.

This invention relates to the pipe coating industry and, more particulary to a method and apparatus for moving pipe joints onto a coating line and removing the mastic-coated pipe joints from the line while the coating is in a semi-molten state.

It has been common practice to manually roll joints of pipe onto a coating line by positioning at least one man at either end of the joint and then turning the joint by hand to roll it. At best, this is difficult manual labor with no assurance that the pipe joint will move onto the line which is to advance it longitudinally in proper alignment. Heretofore, once a mastic coating is applied to the pipe joints, they have been placed in a cooling circle to allow the soft coating to harden sufficiently to permit handling of the coated surface. Utilization of the cooling circle at the end of the coating line has been necessary because of the lack of techniques and apparatus which would allow handling of the coated joints of pipe while the coating is still in a semi-molten state without damage to the coating. The cooling circle at the end of the coating line results in a "log jam" which limits the speed at which the coating operation can be conducted.

Furthermore, a large, expensive crane is required for grasping the ends of the coated joints of pipe and moving them into the cooling circle and then subsequently depositing them for various finishing operations. The manner in which the crane lifts the joints of pipe from the coating line subjects the uncoated ends of the joints to possible damage and, in addition, several workmen are required to properly place the joints in a cooling circle.

It is therefore an object of the present invention to provide a method and apparatus for handling mastic coated joints of pipe while the coating is in a semi-molten state to thereby avoid the cooling step previously required and the resulting "log jam" at the end of the coating line.

Another object of the present invention is a method and apparatus for handling joints of pipe coated with a mastic coating while the latter is in a semi-molten state to reduce the large number of workmen required when the coating is first removed from the coating line, cooled and then picked up and moved again for subsequent finishing operations.

It is also one of the aims of this invention to provide a method and apparatus for handling mastic coated joints of pipe wherein the coating can be handled while still in a molten state thereby eliminating all direct contact between the uncoated ends of the joint and machinery which could potentially damage these ends.

Another important aim of the present invention is to provide apparatus for handling mastic coated joints of pipe while the coating is still in a semi-molten state wherein the lifting force exerted by the apparatus is applied by arms having pipe-embracing saddles which apply the lifting forces radially inwardly over a sufficiently large area of the coated surface to avoid any damage to the coating. As a corollary to the above object, it is one of the objectives of this invention to provide lifting arms having saddles mounted by couplings which accommodate movement of the saddles about an axis perpendicular to the longitudinal axis of the pipe to thereby avoid the application of line forces to the coating.

Another important object of this invention is to provide apparatus for receiving the coated joints of pipe after they have been removed from the coating line and while the coating is still in a semi-molten state wherein the receiving surface is sufficiently yieldable to avoid the application of line forces to the coating.

One of the objectives of this invention is to provide a method and apparatus for removing the couplers from the ends of mastic coated joints of pipe while the coating is still in a semi-molten state wherein the couplers can be swung through an arc of 180° to remove them from the vicinity of the joints to thereby facilitate handling and finishing of the latter.

Another object of the present invention is to provide apparatus to automatically move a joint of pipe onto a line of longitudinal advancement to substantially reduce the manual labor involved and assure proper alignment of the pipe joint when it reaches the line.

An aim of this invention is to provide a method and apparatus of moving joints of pipe onto a coating line and removing the joints from the line while the coating is still in a semi-molten state without the need for manual labor to be employed from the time the joint is first moved onto the line until after it has been removed from the line and finishing operations performed.

An objective of this invention is also to provide apparatus for receiving joints of pipe removed from a coating line while the coating is still semi-molten and moving the joints to a finishing station which apparatus can accommodate at least two joints simultaneously to facilitate rapid handling.

As a corollary to the above object, an important aim of the invention is to provide apparatus which can pick up one joint from a position adjacent the coating line while a second joint is picked up from a station where a finishing operation is being performed.

As another corollary to the object second above, an aim of this invention is to provide apparatus wherein a first coated joint of pipe may be moved to a finishing station while a second joint which has previously been finished is deposited on holding racks or the like for movement to a storage area.

In the drawings:

FIG. 1 is a top plan view of a portion of a coating plant utilizing the method and apparatus of the present invention for moving a pipe joint onto a line of longitudinal advancement;

FIG. 2 is an enlarged side elevational view of one of the pipe kickers which moves a joint of pipe onto a line of longitudinal advancement;

FIG. 3 is a top plan view of the pipe kicker of FIG. 2;

FIG. 4 is a vertical cross-sectional view taken along line 4—4 of FIG. 3;

FIG. 5 is an enlarged elevational view of one of the telescoping arms which moves the coated pipe from the coating line;

FIG. 6 is an enlarged elevational view illustrating how the arms lift the coated pipe from the coating line;

FIG. 7 is a still further enlarged vertical cross-sectional view taken along line 7—7 of FIG. 6;

FIG. 8 is an enlarged vertical cross-sectional view, on the same scale as FIG. 7 and taken along line 8—8 of the latter FIGURE;

Figure 9:
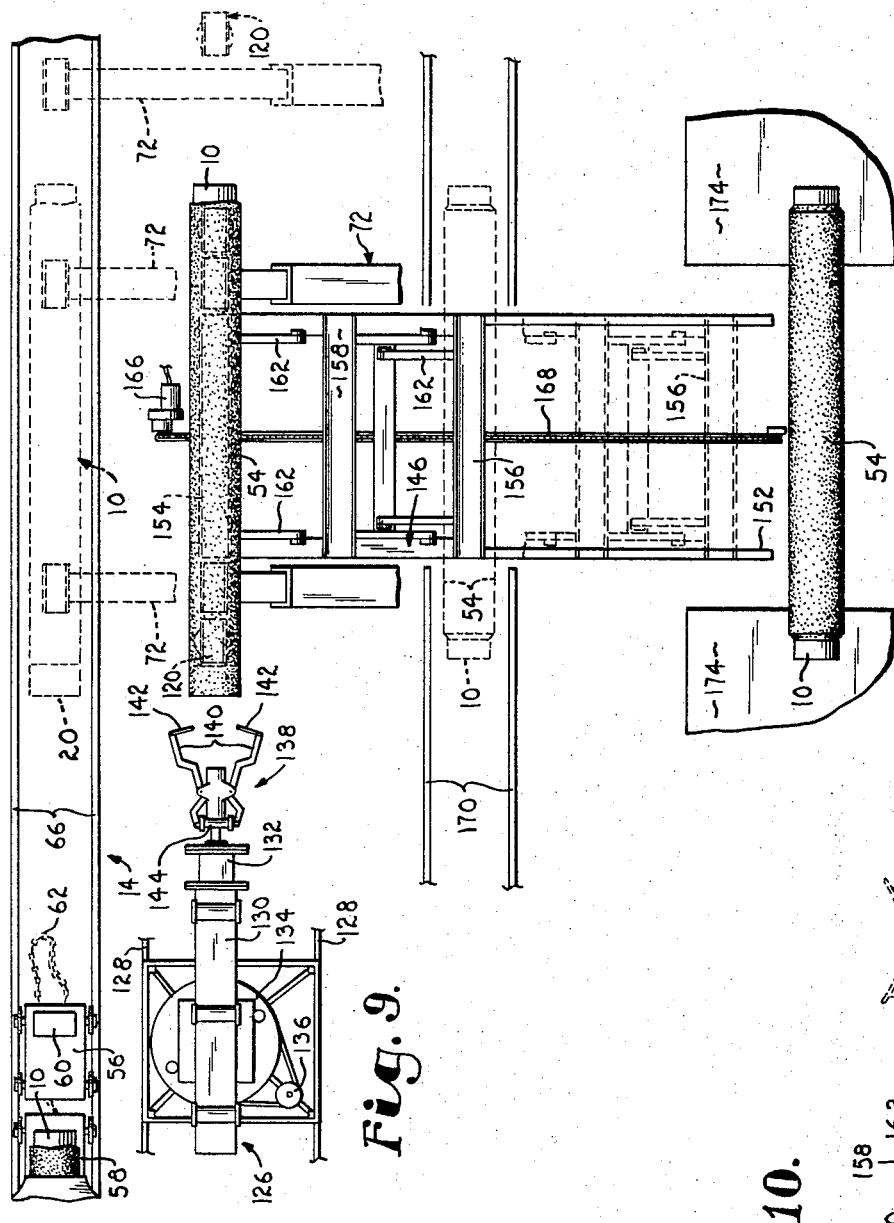
FIG. 9 is a top plan view of the opposite end of the coating line from that shown in FIG. 1 and illustrating apparatus for receiving the coated pipe from the arms after removal from the coating line.

Referring initially to FIG. 1, two joints of pipe 10, one of which is shown in broken lines, are disposed upon racks 12 for delivery to a line of longitudinal advancement such as the coating line designated generally by the numeral 14. Coating line 14 comprises a conventional "endo" conveyor system designated generally by the numeral 18. Conveyors of this type are well known to those skilled in the art and are driven through standard drive mechanism and prime mover (not shown).

Each joint of pipe 10 is first fitted with a coupler 20 at its trailing end for joining it with another length of pipe and then moved into position ahead of a pair of pipe kickers designated generally by the numeral 22. Each kicker 22 is identical and for this reason only one will be described in detail.

Each kicker 22 comprises a generally "stretched out" S-shaped arm 24 which is pivotally mounted at a point approximately midway along its length on a supporting platform 26. At the uppermost end of arm 24 there is a freely rotatable contact wheel 28 having at least a portion of its circumferential edge disposed above the horizontal plane of racks 12. Preferably, the uppermost circumferential point of wheel 28 will be below a horizontal bisector of pipe joint 10. A counterweight 30 at the lowermost end of arm 24 assures that the arm will always be returned to the substantially raised position illustrated in FIG. 2 although it is to be understood that the arm may be moved into the position illustrated in phantom in this figure wherein wheel 28 is below the supporting surface of racks 12. It is also to be noted that platform 26 presents a stop 32 for limiting movement of the arm under the influence of counterweight 30. Wheel 28 is movable in the direction of a joint of pipe 10 positioned immediately in frong of the wheel by virtue of an actuator in the form of a hydraulic cylinder and piston assembly 34. Cylinder 34 is coupled with the rear of platform 26 and may be controlled by air or hydraulic fluid. A generally rectangular supporting framework 36 has its sides constructed from channel irons 38 to present a track for guiding wheels 40 which mount platform 26 for reciprocal movement by cylinder 34.

After a joint 10 is delivered onto "endo" conveyor 18 it is advanced to a traction driver 42 comprising a housing 44 and a plurality of high speed rollers 46 which engage both the top and bottom of a joint of pipe 10 although only the bottom rollers 46 are visible in FIG. 1. A hopper 48 receives the coating material from a pugmill (not shown) and delivers the same to a pressure pump disposed within a housing 50, the latter communicating with an extrusion nozzle 52.

As the joint 10 advances through the nozzle 52, a coating 54 is placed on the outer surface of the joint. The forwardmost of a pair of buggies 56 and 58, visible in the upper left-hand corner of FIG. 9, has a carriage projection 60 provided with an appropriate lip for catching the forward end of a coated joint of pipe 10. A chain or cable 62 couples the forward buggy 56 with the trailing buggy 58, and the chain is of a length slightly less than the length of the pipe joint. Thus, when the joint 10 has advanced to a point where cable 62 is taut, a lift on the buggy 58 is actuated to raise a carriage 64 (FIG. 1) on the buggy into engagement with the coating 54 to support the trailing end of the joint 10. The buggy 56 is powered by an appropriate prime mover such as an electirc motor or gasoline engine to continue to advance joint 10 along tracks 66. Manifestly, coupler 20 on the trailing end of a joint 10 is broken away from the forward end of a trailing joint by advancing the buggies 56 and 58 at a speed greater than the rate of advancement of the joint 10 past nozzle 52. Also, as the coated joint 10 moves past the nozzle, it is sprayed by a stream of water emanating from lines 68 and 70 for cooling purposes. Whitewash to protect the coating from the sun is also normally applied with the cooling water.

As a coated joint 10 advances along tracks 66 to the far end of the coating line 14, the joint is picked up and moved laterally of the line by a pair of elongated telescoping arms designated generally by the numeral 72. Three arms 72 are normally provided and are disposed in spaced relationship as illustrated in FIG. 9, however, only two of the arms are utilized at one time for picking up a joint 10. The third arm 72 permits handling of joints 10 of different lengths. Each of the arms 72 is identical and hence only one will be described in detail. Each arm comprises a pair of telescoping sections 74 and 76 disposed one inside of the other. The inner section 76 is mounted for reciprocation relative to the outer section 74 by a plurality of rollers 78. A power cylinder 80 has one end secured to the end of section 74 and its piston rod 82 coupled with inner section 76 through a plate 84 which is welded or otherwise rigidly secured to the inner section. Thus, cylinder 80 effects telescoping movement of the two sections.

The arm 72 is pivotally mounted for reciprocation about a horizontal axis by a bracket 86, an upright standard 88, and a connecting pin 90. The arm 72 is moved about the axis presented by pin 90 by a cylinder 92 disposed at the forward end of the arm and pivotally mounted at its lowermost end to a base 94. An actuator rod 96 projecting from cylinder 92 is pivotally coupled with section 74 by a depending bracket 98 and a pivot pin 100. A pair of elongated vertical posts 101 disposed adjacent cylinder 92 provide a stop for limiting the downward movement of arm 72.

Referring additionally to FIGS. 6-8, it is seen that a pipe receiving generally arcuate saddle 102 is mounted at the end of section 76 by a pivotal coupling designated generally by the numeral 104. The saddle 102 has an inner surface 106 which is generally complemental to the configuration of coating 54 on a joint of pipe 10. The saddle 104 is supported upon a pair of rigidly interconnected horizontal plates 108, the lowermost of which mounts a pair of depending ears 110. Rigid with section 76 is a box frame 112 having a pair of upwardly projecting ears 114 complemental to depending ears 110 and in alignment therewith. Thus, a pivot pin 116 projects through the ears 110 and 114 to pivotally mount saddle 102. Movement of the saddle about the horizontal axis presented by pin 116 is dampened by coil springs 118 disposed on either side of the pin.

Disposed adjacent tracks 66 for receiving a coated joint of pipe 10 lifted from the coating line by arms 72 are first and second spaced apart saddle stands 120. A third stand 120 is positioned adjacent the third arm 72 for supporting a joint 10 of a different length. Each stand 120 comprises a vertical support 122 and a pipe receiving saddle 124 of generally the same construction as the saddle 102 above described. Stands 120 are illustrated in phantom in their pipe-supporting positions in FIG. 9.

Figure 10:
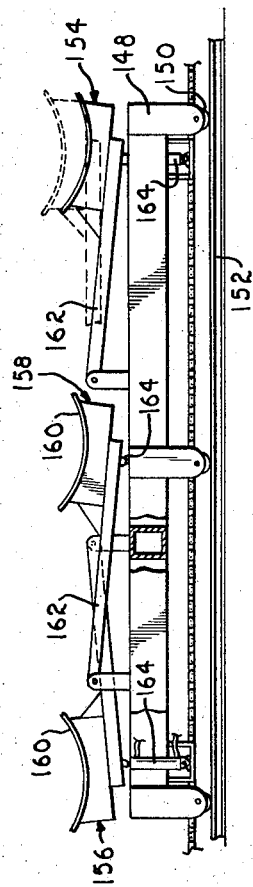
FIG. 10 is an enlarged side elevational view of the carrier which receives the coated pipe and moves it away from the coating line.

Referring additionally to FIGS. 9 and 10, it is seen that a coupler puller designated generally by the numeral 126 is disposed adjacent coating line 14 in longitudinal alignment with stands 120. Puller 126 is disposed for back and forth movement along a pair of tracks 128 disposed in parallel relationship to tracks 66. Puller 126 comprises a pair of telescoping sections 130 and 132 which are mounted for rotation in a horizontal plane by a rotatable base 134. Base 134 can be rotated 180° by a prime mover 136. An appropriate cylinder (not shown) moves section 132 relative to section 130. A clamp structure designated generally by the numeral 138 is rigid with section 132 and comprises a pair of clamps 140 each of which has a vertically disposed generally arcuate coupler engaging portion 142. The clamps 140 are disposed for movement in a jaw-like action by pivoting about a vertical axis through appropriate power cylinders 144, one of which is visible in FIG. 9.

Disposed between arms 72 is a pipe supporting carrier designated generally by the numeral 146. Carrier 146 comprises a generally rectangular supporting framework 148 mounted on wheels 150 for reciprocable movement over a pair of spaced apart tracks 152. Three pipe receiving saddles 154, 156 and 158 are disposed respectively at the opposite ends of framework 148 at a point approximately midway of the framework. Each of the saddles is provided with a yieldable inner surface 160 for engagement with the coating 54 and it is desirable that the saddle 154, 156 or 158 extend over an area at least equal to one-third of the length of a joint 10 being supported. Preferably, the surface 160 of each saddle will extend through an arc of at least 60° to distribute lifting forces over the radius of the coated pipe. By utilizing a material for the surfaces 160 which is characterized by having less resistance to deformation than the semi-molten coating 54, the danger of the coating being damaged is minimized.

Each saddle 154-158 is mounted for vertical reciprocal movement by a pair of cantilevered arms 162. Arms 162 increase the mechanical leverage available for raising the saddles by extending in opposite directions to a maximum length in the case of end saddles 156 and 158. The arms for saddle 158 extend in the same direction as those of saddle 154. Underlying each saddle 154-158 are a pair of cylinder assemblies 164 which may be actuated in a conventional manner by air, hydraulic fluid or the like. One of the cylinders for each of the three saddles is visible in FIG. 10. Cylinders 164 are actuated to raise each of the saddles to the position indicated in broken lines for saddles 154. Cylinders 164 are independently operable to allow independent movement of different joints of pipe resting on the respective saddles. Carrier 146 is moved over tracks 152 by a prime mover 166 which drives a chain 168 that is coupled with the carrier through an appropriate drive mechanism (not shown).

Disposed in parallel relationship to tracks 66 are two pairs of tracks 170 and 172 extending on either side of carrier 146. These tracks, which represent a finishing station, position an end trimmer in the form of a beveling machine which finishes the ends of the coating after the couplers have been pulled away. At the far end of tracks 152 a pair of spaced apart holding boards 174 are located for receiving the coated pipe from carrier 146.

In operation, joints of pipe 10 are positioned on holding racks 12 prior to advancement onto coating line 14. An individual worker at one end of a joint can manually roll the joint into position in front of kickers 22. This is possible because of the pivotal mounting of arm 24 which allows wheel 28 to be moved into the lowered position illustrated in broken lines in FIG. 2. When joint 10 clears the wheel 28, counterweight 30 will return arm 24 to its raised position. Use of manual labor at this point is acceptable since the laborer has adequate time to move the joint into position and exact alignment of the joint in front of kickers 22 is not critical. Next, the laborer places coupler 20 on the end of the joint and actuates kickers 22 through a common control to roll the joint of pipe onto "endo" conveyor 18. The line of force exerted by kickers 22 is in a plane parallel to the supporting surface of racks 12 and when wheels 28 contact the cylindrical surface of the pipe the latter will begin to roll in a clockwise direction as the opposing force causes wheels 28 to rotate in a counterclockwise direction. This assures that the pipe will be rolled onto "endo" conveyor 18. The rolling movement minimizes the force required to be exerted by cylinders 34 and also assures that sliding of the joints alog the supporting surface which could scar the pipe or result in uneven advancement is avoided. Since cylinders 34 are constructed to exert the same force over a predetermined common distance, proper longitudinal alignment of the pipe on the conveyor is assured even when the pipe is not exactly aligned in front of kickers 22.

The coating 54 which is normally an asphaltic mastic type of material well known to those skilled in the art, is applied through nozzle 52 as the joint 10 is advanced longitudinally. The coated joints are picked up by buggies 56 and 58 which move the pipe to a position in alignment with arms 72. At this point, coating 54 is still in a semi-molten state, and cylinders 80 are activated to extend arms 72 between the spaced apart buggies and directly beneath the joint of pipe 10 as indicated by the broken line illustrated in FIG. 9. Arms 72 should extend beneath the joint so as to provide for planar alignment of a vertical bisector of the pipe and a vertical bi-sector of saddles 102. This assures that when a lifting force is applied by cylinders 92 to the coating 54 the component forces will be directed radially inwardly from arcuate surface 106 and distributed over the entire surface of the saddles rather than being applied as a line force which could damage the coating. By virtue of the fact that saddles 102 can pivot about pin 116 inexact correlation of the lifting forces from cylinders 92 can be accommodated without damage to the coating. The extent to which cylinders 92 lift arms 76 has been exaggerated somewhat in the phantom position shown in FIGS. 5 and 6 for purposes of illustration. It is to be understood, of course, that arms 72 need only to raise the joint 10 slightly to lift it off of buggies 56 and 58. The joint 10 is removed from the buggies and deposited on stands 120 immediately adjacent the coating line. Again, the use of arcuate pipe-embracing saddles 124 results in the lifting force being applied radially inwardly and distributed over the entire surface of the saddle to avoid damage to the coating. It is desirable to provide saddle 124 with a yieldable surface to further assist in distributing forces and avoid damage to the coating from the application of line forces.

Next, the telescoping section 132 of puller 126 is extended to move the clamp structure 138 into position adjacent coupler 50 on the trailing end of coated joint 10. The cylinders controlling clamps 140 are activated to bring the clamps into engagement with the coating on the outside of the coupler. The clamping force should be of a magnitude sufficient to rupture the coating to provide a surface against which a pulling force can be exerted by retracting the section 128. This causes the coating 54 to fracture at the line of juncture between the end of the coupler and the coating on the joint 10. Thus, the coupler 20 may be slid relative to the joint until it has cleared the end of the latter.

Once the coated coupler 20 is free from the end of joint 10, prime mover 136 is actuated to swing sections 130 and 132 through an arc of approximately 180° into the position illustrated in FIG. 1 adjacent the end of rail 176. An appropriate hook (not shown) receives the coupler and a conveyor (not shown) advances it to clean-up station 178 where the coating is removed.

Meanwhile, carrier 72 has been moved into position with its furthermost saddle 154 underlying coated joint 10 and cylinders 164 actuated to move the saddle into the raised position shown in broken lines in FIG. 10. Thus, joint 10 is lifted off of its first location stands 120 and prime mover 166 is actuated to move the carrier 146 away from the coating line to bring joint 10 held by saddle 154 into alignment with tracks 170 and 172 at the finishing station. Again, since the coating 54 is still in a semi-molten state, the configuration of saddle 154 to distribute the lifting forces over the maximum possible area and avoid the application of line forces is highly desirable. In furtherance of this objective, surfaces 160 are constructed from a material having the characteristic of a resistance to deformation which is less than the resistance of coating 38 while still in a semi-molten state.

When the first joint coming off coating line 14 has been moved into alignment with tracks 170 and 172 by carrier 146, appropriate finishing machines (not shown) are moved into position to accept the pipe and trim or bevel the ends of the coating which have been fractured by the removal of couplers 20.

In the interim, as soon as carrier 146 has passed a joint 10 to the finishing machines, it is again advanced toward the coating line 14 to be in position to receive a second joint which has been deposited on stands 120 by arms 72. It should be noted that the two saddles 154 and 156 are spaced apart a distance equal to the distance between the first location of pipe joint 10 and stands 120 and the finishing station located at tracks 170 and 172. Likewise, the distance between saddles 154 and 156 is equal to the distance between the finishing station and the second location of the pipe joints 10, on holding boards 174. Thus, as soon as carrier 146 is ready to lift a second joint off of stands 120, the trimming operation being performed at tracks 170 and 172 will normally be completed allowing rearward saddle 156 to lift the first joint 10 located at tracks 170 and 172 at the same time saddle 154 lifts a second joint off of stands 120. The carrier 146 is again moved away from the coating line to bring the second joint 10 on saddle 154 into alignment with tracks 170 and 172 for the finishing operation. Simultaneously, saddle 156 carrying the first joint 10 is moved to the area of holding boards 174 and simultaneously with saddle 154 passing its joint to the finishing machines, saddle 156 is lowered to deposit the first joint 10 onto boards 174. At this point the coating 54 is "jeeped" by an electric device having a conductive band surrounding the pipe to detect any imperfections. The pipe may then be moved to an appropriate holding area prior to loading on a transport vehicle.

The third saddle 158 on carrier 146 is provided to give the carrier additional versatility should this be necessary. For example, if a joint 10 should need reworking by the finishing machines disposed on tracks 170 and 172, while another joint is on stands 120 and a third joint is ready to come off line 14, buggy 154 may be utilized to pick up the joint off stands 120, without raising buggy 156 to pick up the joint at the finishing station. Instead, carrier 146 is moved to bring saddle 158 into alignment with the finishing station, thus giving additional time to complete the finishing operation. When finishing is completed saddle 158 will carry the joint 10 to holding boards 174 saddle 154 will deliver the next joint to the finishing station.

Thus, the method and apparatus of the present invention allows for complete automation of a coating operation for applying mastic type coating to joints of pipe. Manual labor is eliminated from a point in time before the uncoated pipe is placed on the coating line until after all finishing operations have been completed. By allowing the coating to be handled while still in a molten state, the need for placing the coated joints in a cooling circle is eliminated. Instead, the joints are continually advanced in a uniform manner which allows for a maximum rate of operation of the coating plant.

Having thus described the invention, what is claimed as new and desired to be secured by letters patent is:

1. In the application of mastic coatings to joints of pipe, the improvement of apparatus for handling an elongated, coated joint of pipe while the coating is in a semi-molten state, said apparatus comprising:
 first and second telescoping arms adapted to be moved into underlying relationship to a coated joint of pipe;
 a pipe-receiving saddle for each of said arms;
 coupling means for mounting each of said saddles on a corresponding arm to accommodate free movement of each saddle about an axis perpendicular to the longitudinal axis of the pipe; and
 means for raising and lowering each of said arms in a vertical plane whereby a coated joint of pipe can be picked up and moved without damage to the coating.

2. The invention of claim 1, wherein each of said arms comprises first and second telescoping sections; and power cylinder means for moving one of said sections relative to the other section.

3. The invention of claim 2, wherein each of said arms is pivotally mounted for reciprocation about a horizontal axis, and said raising and lowering means comprises power cylinder means coupled with said other section at the forward end of said arm.

4. The invention of claim 1, wherein is included means for damping movement of each of said saddles about said axis.

5. The invention of claim 4, wherein each of said saddles comprises a generally arcuate member having an inner surface conforming to the configuration of said pipe.

6. The invention of claim 1, wherein is included, a supporting framework, first and second elongated pipe receiving saddles mounted on the framework in spaced apart relationship intermediate said arms for receiving a coated joint of pipe from the latter; each saddle having a pipe supporting surface complemental in configuration to the configuration of the coated pipe; and means for independently raising and lowering each of said saddles to and from a pipe-supporting position, whereby a pair of pipe joints may be simultaneously carried by the saddles and a finishing operation performed on one of the joints while the other joint is deposited at a distal location.

* * * * *